3,219,683
DICHLOROCYCLOPROPANEBORONATE

William G. Woods, Anaheim, and Irving S. Bengelsdorf, Santa Ana, Calif., assignors to United States Borax & Chemical Corporation, Los Angeles, Calif., a corporation of Nevada
No Drawing. Filed Nov. 30, 1962, Ser. No. 241,179
1 Claim. (Cl. 260—462)

This invention relates as indicated to a novel dichlorocyclopropaneboronate.

It is, therefore, the principal object of this invention to provide a novel dichlorocyclopropaneboronate compound.

It is a further object of this invention to provide a process for preparing said novel compound.

Other objects will become apparent from the following disclosure.

To the accomplishment of the foregoing and related ends, said invention then comprises the features hereinafter fully described and particularly pointed out in the claim, the following description setting forth in detail certain illustrative embodiments of the invention, these being indicative, however, of but a few of the various ways in which the principle of the invention may be employed.

The novel composition provided by the present invention is the compound 2-($\beta,\beta$-dichlorocyclopropyl)-4,4,6-trimethyl-1,3-dioxa-2-borinane, which can be represented by the formula $$\begin{array}{c} CH_3 \quad\quad Cl \quad Cl \\ | \quad\quad\quad\quad \backslash / \\ CH_3-C-O \quad\quad C \\ / \quad\quad\quad\quad / \backslash \\ CH_2 \quad B-CH-CH_2 \\ \backslash \quad\quad / \\ CH-O \\ | \\ CH_3 \end{array}$$

The compound is a colorless, mobile liquid, having good hydrolytic stability. It is useful as a herbicide, exhibiting herbicidal activity especially when applied as a pre-emergence treatment.

The compound is readily prepared by reaction of 2-vinyl-4,4,6-trimethyl-1,3-dioxa-2-borinane with dichlorocarbene in an inert liquid medium. Substantially equimolar amounts of reactants are used for best yields of the desired product. The dichlorocarbene can be generated in situ, such as by the decarboxylation of sodium trichloroacetate in 1,2-dimethoxyethane as described by Wagner, Proc. Chem. Soc., 229 (1959). Conventional procedures, such as fractional distillation under reduced pressure, are used for isolation and purification of the desired product.

The intermediate, 2-vinyl-4,4,6-trimethyl-1,3-dioxa-2-borinane can be prepared by reaction of a 2-alkoxy-4,4,6-trimethyl-1,3-dioxa-2-borinane with vinyl magnesium chloride as illustrated by the following example.

Example I

A 500 ml. round-bottomed flask containing 75 ml. of ether was cooled to —70° C. With constant agitation, 54 ml. (0.25 mole) of 2-n-butoxy-4,4,6-trimethyl-1,3-dioxa-2-borinane and 96.2 ml. (0.25 mole) of 2.60 M vinyl magnesium chloride solution in tetrahydrofuran were simultaneously added in increments to the ether over a 16-minute period. A solid precipitate formed which dissolved when the reaction mass was allowed to warm to room temperature. About one-half of the tetrahydrofuran and all of the ether were then removed by distillation at atmospheric pressure. The pressure was then reduced to about 1 mm., the temperature was increased slowly to about 210° C., and a liquid distillate was recovered leaving behind a solid residue in the reaction flask. The distillate was then fractionally distilled and 30.65 grams (79.2% yield) of 2-vinyl-4,4,6-trimethyl-1,3-dioxa-2-borinane, B.P. 69–70° C. at 35 mm., was recovered.

The following example illustrates the preparation of the compound of the present invention.

Example II

A mixture of 27.0 grams (0.175 mole) of freshly distilled 2-vinyl-4,4,6-trimethyl-1,3-dioxa-2-borinane and 32.5 grams (0.175 mole) of sodium trichloroacetate in 75 ml. of freshly distilled 1,2-dimethoxyethane was boiled under reflux for 21 hours. The resulting slurry was filtered to separate sodium chloride and the filtrate fractionally distilled under reduced pressure. After taking a lower boiling forecut, 2 - ($\beta,\beta$ - dichlorocyclopropyl) - 4,4,6-trimethyl-1,3-dioxa-2-borinane was collected at 71°–71.5° C./0.85–0.92 mm.; $n_D^{25}$ 1.4560. The infrared spectrum was consistent with that expected of the assigned structure.

Elemental analysis gave the following results: Calculated for $C_9H_{15}BCl_2O_2$: C, 45.62; H, 6.38; B, 4.57; Cl, 29.93. Found: C, 45.86; H, 6.43; B, 4.47; Cl, 30.0.

As hereinbefore pointed out, the compound of the present invention is useful as a herbicide. For example, when the compound was applied (as a methanol solution) to soil as a pre-emergence treatment at a rate of 13.4 pounds per acre, it appeared to have selectivity for the dicotyledonous species. Cucumbers and beans were all killed, while peas and mustard were stunted.

Other modes of applying the principle of the invention may be employed, change being made as regards the details described, provided the features stated in the following claim or the equivalent of such be employed.

We, therefore, particularly point out and distinctly claim as our invention:

2 - ($\beta,\beta$-dichlorocyclopropyl)-4,4,6-trimethyl-1,3-dioxa-2-borinane.

References Cited by the Examiner

Fieser and Fieser: "Advanced Organic Chemistry," pp. 536–543 (January 1962).

Wagner: "Proc. Chem. Soc.," page 229 (1959).

CHARLES B. PARKER, *Primary Examiner.*

L. D. ROSDOL, *Examiner.*